United States Patent [19]

Umemura

[11] Patent Number: 5,055,732
[45] Date of Patent: Oct. 8, 1991

[54] ULTRASONIC MOTOR

[75] Inventor: Chiaki Umemura, Toyohashi, Japan

[73] Assignee: Aisin Seiki Kabushiki Kaisha, Kariya, Japan

[21] Appl. No.: 631,877

[22] Filed: Dec. 21, 1990

Related U.S. Application Data

[63] Continuation-in-part of Ser. No. 333,532, Apr. 5, 1989.

[51] Int. Cl.$^5$ .............................................. H01L 41/08
[52] U.S. Cl. ................................................... 310/323
[58] Field of Search ................................ 310/323, 328

[56] References Cited

U.S. PATENT DOCUMENTS 4,587,452 5/1986 Okumura et al. .................. 310/328

FOREIGN PATENT DOCUMENTS

| 0178988 | 10/1984 | Japan | 310/323 |
| 0148387 | 8/1985 | Japan | 310/323 |
| 0224883 | 10/1986 | Japan | 310/323 |
| 0011073 | 1/1988 | Japan | 310/323 |
| 0283475 | 11/1988 | Japan | 310/323 |

*Primary Examiner*—Mark O. Budd
*Attorney, Agent, or Firm*—Burns, Doane, Swecker & Mathis

[57] ABSTRACT

An ultrasonic motor comprises an elastic member inserted between a piezoelectric vibrator and a rotor. The elastic member comprises a base portion and plurality of projecting portions. Each of the projecting portions tapers toward its free end and is preferably of trapezoidal shape. The ratio of height to maximum width for each projecting portion is at least 1.0. The elastic member has a natural frequency substantially corresponding to a drive frequency of the vibrator.

7 Claims, 7 Drawing Sheets

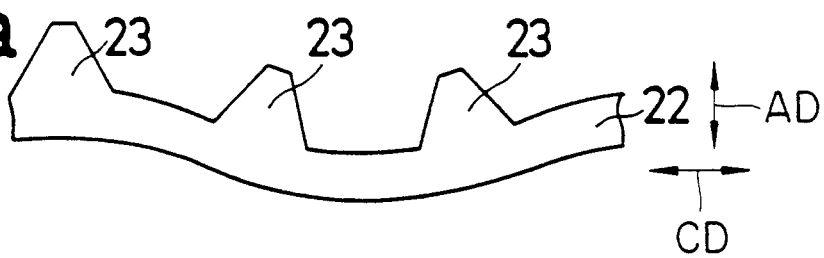
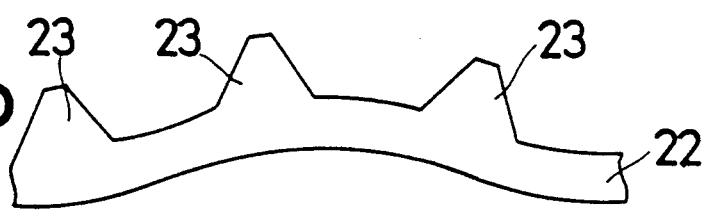
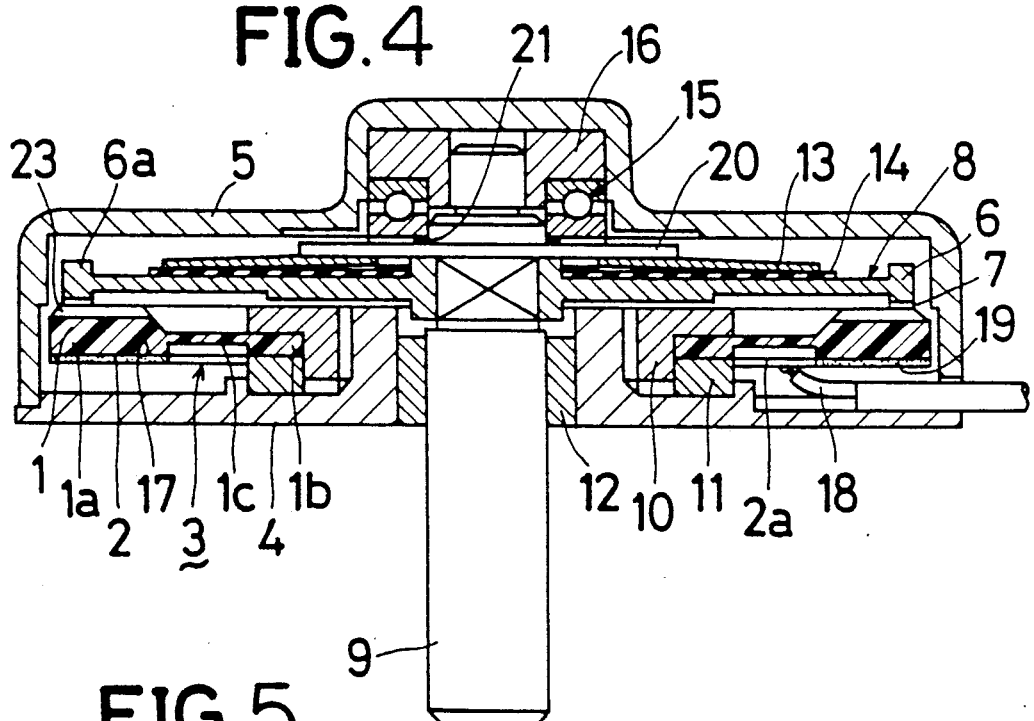
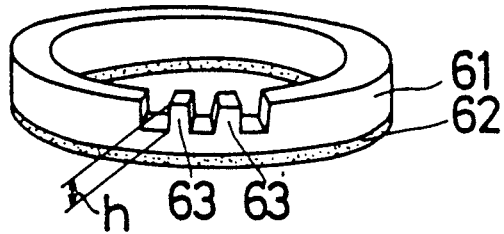

ULTRASONIC MOTOR

RELATED INVENTION

This is a continuation-in-part of U.S. application Ser. No. 07/333,532 filed Apr. 5, 1989, now abandoned.

BACKGROUND OF THE INVENTION

1. Field of the Invention

The present invention relates to an ultrasonic motor and more particularly to an elastic member which is utilized in the ultrasonic motor.

2. Description of the Prior Art

Conventionally, an ultrasonic motor has been proposed for rotating a rotor by using the expansion and contraction generated at a piezoelectric vibrator. This kind of ultrasonic motor is exemplified by Japanese Patent Laid Open Nos. 58(1983)-192474 and 48(1983)-192475. However, there is a drawback involving the presence of substantial noise in these ultrasonic motors which results in wear at a contact surface between the piezoelectric vibrator and the driven rotor. In order to solve that drawback, an ultrasonic motor has been proposed wherein a elastic member is interposed between the piezoelectric vibrator and the rotor. A travelling wave is generated at the elastic member by the piezoelectric vibrator in this conventional ultrasonic motor, thereby rotating the rotor. This kind of the ultrasonic motor is disclosed in Japanese Patent Laid Open No. 61(1986)-19127.

In a conventional ultrasonic motor which generates a travelling wave at an elastic member by a piezoelectric vibrator, it is desirable to maximize the amplitude of the travelling wave generated at the elastic member, because the mechanical output of the rotor is increased and the efficiency of converting electrical input energy to mechanical output energy is improved when the amplitude of the travelling wave is enlarged.

In Japanese Patent Laid Open No. 61(1986)-191278, the amplitude of a travelling wave is enlarged by forming a plurality of projecting portions 63 on the elastic member 61 as shown in FIG. 5 herein. The projecting portions 63 have a parallelogram configuration wherein the side surfaces 61A and 61B are parallel. The amplitude of the travelling wave generated at the elastic member 61 by a piezoelectric member 62 is enlarged by the projecting portions 63 which are integrally vibrated with the elastic member 61. Accordingly, the amplitude of the travelling wave and the mechanical output from a rotor is enlarged in accordance with the size of height h of the projecting portions 63.

However, the projecting portions will not be integrally vibrated with the travelling wave in conventional ultrasonic motors, if the height of the projecting portions and the frequency of the travelling wave become too great. That is, the travelling wave generated at the elastic member is no longer enlarged, and the mechanical output from the rotor may actually be decreased. In other words, the drive frequency at which the elastic member is vibrated should not exceed the natural frequency of the projections, or else the projections will become out of resonance with that drive frequency. It would thus be desirable to be able to maximize the height h while minimizing the accompanying decrease in the natural frequency of the projections. In that way, the amplitude of vibration and the effective drive frequency can be maximized.

SUMMARY OF THE INVENTION

Accordingly, an object of the present invention is generally to overcome the above disadvantages of the prior art.

Another and more specific object of the present invention is to provide an improved ultrasonic motor in which a projecting portion is formed for integrally vibrating with an elastic member.

In accordance with the present invention, an ultrasonic motor comprises a piezoelectric vibrator, a rotor, and an elastic member interposed between the piezoelectric vibrator and the rotor for transmitting vibration. The elastic member includes a base portion and a plurality of projecting portions. Each projecting portion tapers toward a free end thereof. A ratio of height to maximum width of each of the tapering projecting portions is at least 1.0. The elastic member has a natural frequency substantially corresponding to a drive frequency of the vibrator.

Accordingly, the inertial mass m of the projecting portion is decreased and the spring constant k of the projecting portion is increased. Generally, it is well-known that the natural frequency of this kind of projecting portion is in proportion to the square root of $k/m$. The value of $k/m$ becomes larger in accordance with the present invention, so that the natural (resonance) frequency of the projecting portion is increased, and the projecting portions vibrate integrally with the elastic member.

BRIEF DESCRIPTION OF THE DRAWINGS

The foregoing and other objects, features and advantages of the present invention will be understood more clearly and fully from the following detailed description of preferred embodiments with reference to the attached drawings, wherein:

FIGS. 3a, 3b are views similar to FIG. 2;

FIG. 4 is a longitudinal sectional view through a preferred ultrasonic motor provided with the elastic member according to the present invention;

FIG. 5 is a perspective view of a segment of a conventional elastic member;

DESCRIPTION OF THE PREFERRED EMBODIMENTS

Figure 1:
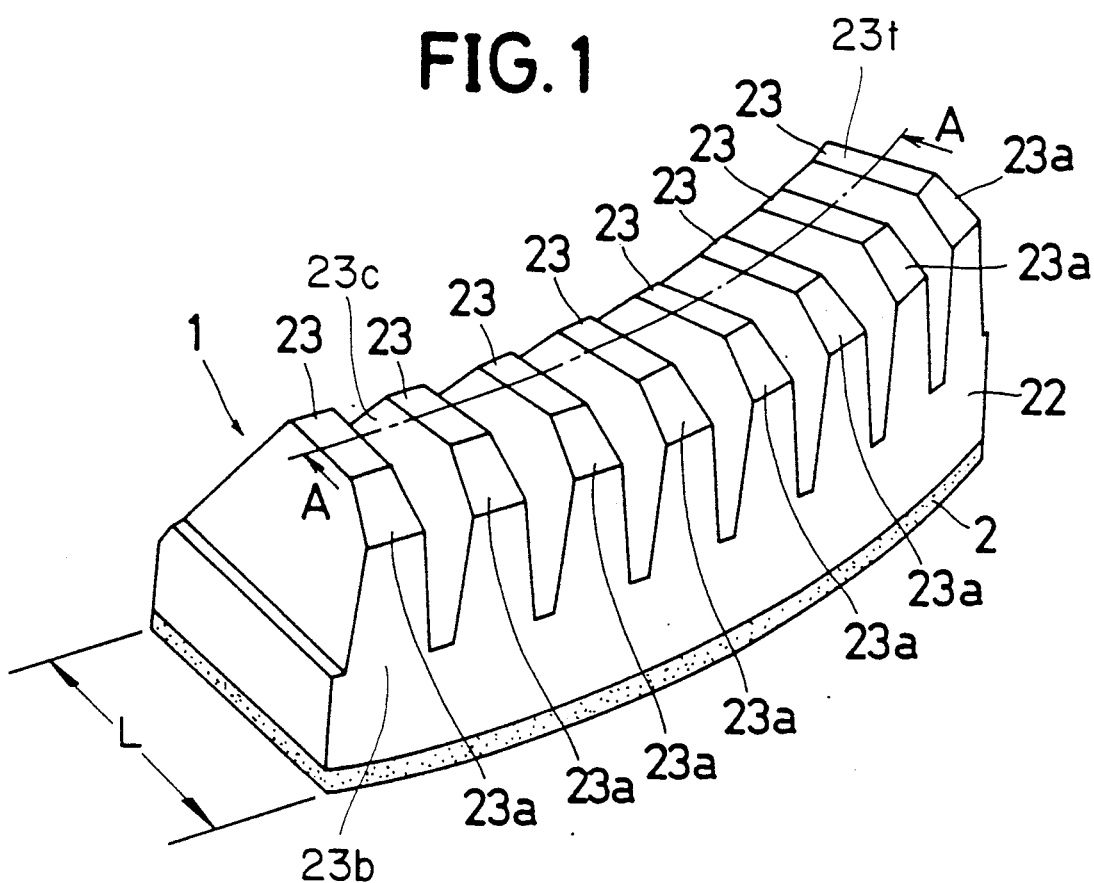
FIG. 1 is a perspective view of a segment of a preferred embodiment of an elastic member according to the present invention.

In FIG. 1 there is shown a preferred embodiment of an elastic member 1 according to the present invention, the elastic member 1 provided with a plurality of projecting portions or teeth 23 extending in cantilever fashion from a ring-shaped base portion 22. A ringshaped piezoelectric vibrator 2 is adhered to the base portion 22. The projecting portions 23 are integrally formed with the base portion 22 by cutting sections out of a solid ring. The elastic member is constructed such that the interval S between root portions 23b of the projection portions 23 is shorter than the half-wave length of the deflection vibration generated at the elastic member 1.

The projecting portions 23 are provided with a chamfer portion 23a. A disc-shaped rotor 8 is contacted with the projecting portions 23 in a manner described hereinafter in connection with FIG. 4.

Figure 2:
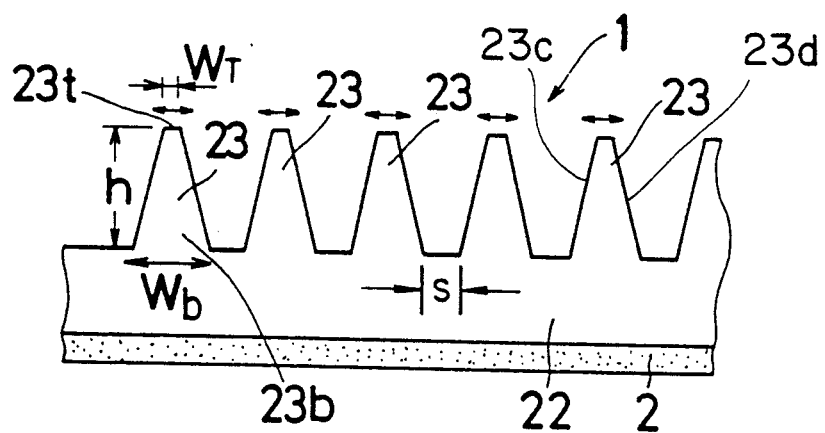
FIG. 2 is a sectional view taken along line A—A in FIG. 1.

Referring now to FIG. 2, the projecting portions 23 formed on the base portion 22 taper toward their free ends, i.e., each projection has side surfaces 23c, 23d which converge toward the free end of the projection. Preferably, the projections are of trapezoidal configuration. Each projecting portion has a free end 23t of a width Wt, and a root portion of a width Wb, and is of a height h.

The width Wt of the free end (which defines the minimum width of the projecting portion) is less than the width Wb of the root end (which defines the maximum width of the projecting portion), i.e., Wt/Wb<1. Also, the minimum circumferential spacing S between adjacent projecting portions, i.e., the spacing between adjacent root ends 23b, is larger than the minimum width Wt of each projecting portion.

The piezoelectric vibrator 2 is provided with a plurality of electrodes 2a which are circumferentially arranged (see FIG. 4). When an alternating voltage is supplied to the electrodes 2a, a deflection vibration is generated at the piezoelectric vibrator 2. The deflection vibration generated at the piezoelectric vibrator 2 is transmitted to the base portion 22 and hence to the entire elastic member 1.

When the deflection vibration is generated at the elastic member 1, the projecting portions 23 are integrally vibrated with the deflection vibration of the base portion 22 as shown in FIGS. 3a, 3b. Two projection portions 23 are located at a bottom portion of the deflection vibration in the state shown in FIG. 3a. In this state, the distance between two projections 23 is decreased in accordance with the height h of the projecting portions 23. In the state shown in FIG. 3b, namely, in the state in which the two projecting portions 23 are located at a top portion of the deflection vibration, the distance between two projecting portions 23 is increased in accordance with the height h of the projection portions 23. Thus, the amplitude of the deflection vibration generated at the base portion 22 is further enlarged in accordance with the height h of the projection portions 23.

If the height h of the projection portions 23 were to be increased, the natural (resonance) frequency of the projecting portions 23 would be decreased. In the event that the height h of the projecting portions 23 exceeds a certain threshold value, the mechanical output of the rotor 8 begins to decrease, because the projecting portions 23 cease to vibrate in resonance with the base portion 22. Accordingly, it is desirable to enable the projections to vibrate in resonance with the base portion 22 at higher frequencies in order to increase the rotational speed of the rotor 8 as much as possible.

Since the projecting portions 23 according to the present invention have a trapezoidal shape, the inertial mass of the projecting portions 23 is decreased and the spring constant of the projecting portions 23 is increased. As a result, the natural frequency of the projecting portions 23 is increased for a given height h.

Figure 6:
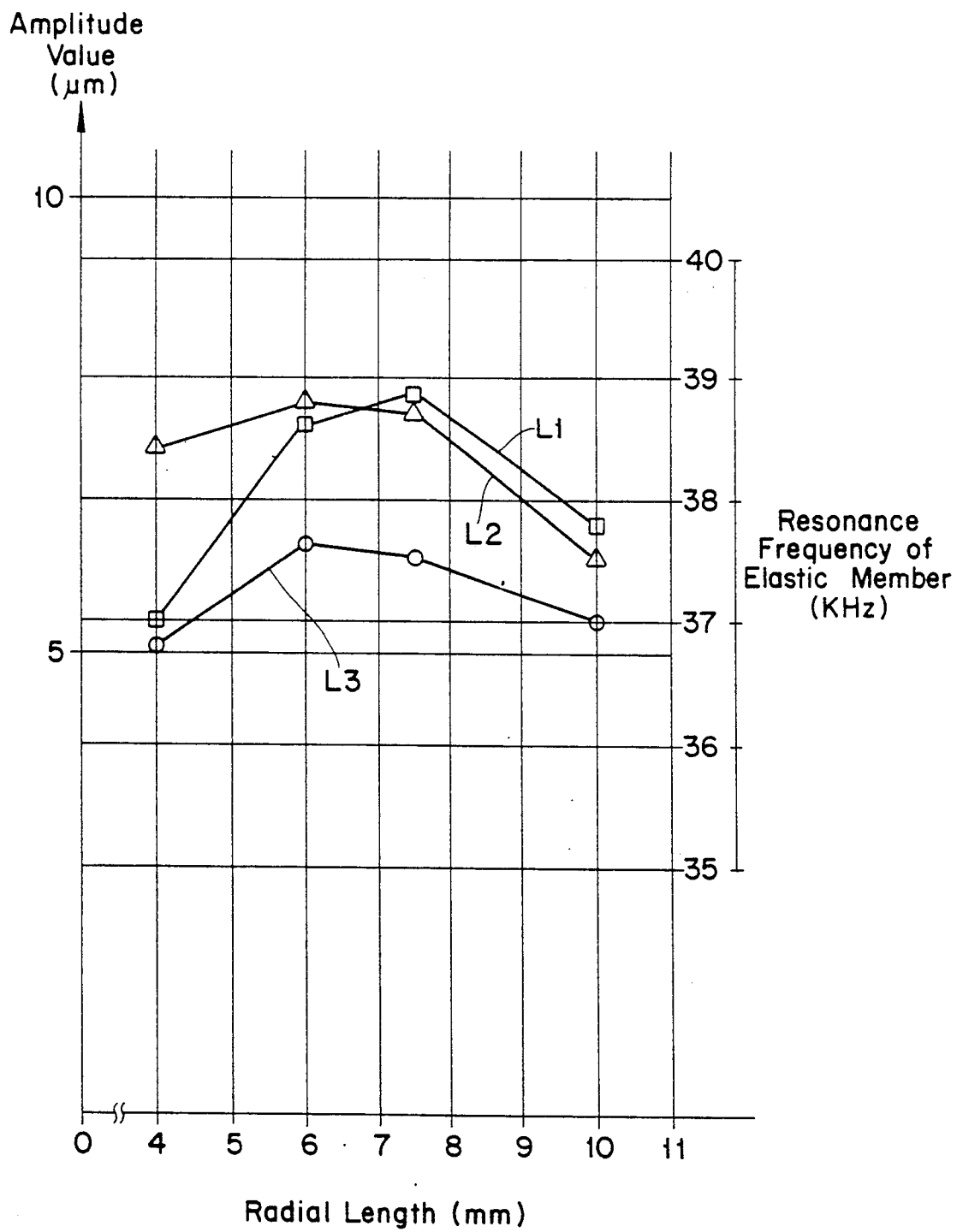
FIG. 6 is a graph representing both vibration amplitude and resonance frequency as a function of the width of an elastic member according to the present invention, the vibration amplitude being represented in both the circumferential and axial directions.

FIG. 6 is a graph in which certain characteristics of the elastic member according to the present invention are presented as a function of the radial length L of the elastic member. In FIGS. 7-10, those characteristics are compared with the prior art as a function of h/Wb, for radial lengths of 4 mm, 6 mm, 7.5 mm and 10 mm, respectively. Properties of the elastic members 1, 61 and the piezoelectric vibrator 2 used for the graph measurements are indicated in the following Table:

TABLE 1

|  | Elastic Member | Piezoelectric Vibrator |
| --- | --- | --- |
| Young ratio (kg/cm$^2$) | $1.34 \times 10^6$ | $6.53 \times 10^6$ |
| Density (kg/cm$^3$) | $8.6 \times 10^{-3}$ | $7.8 \times 10^{-3}$ |
| Poisson ratio | 0.34 | 0.31 |

Each of the elastic members 1, 61 is made of a phosphorus bronze, and a piezoelectric element is used as the piezoelectric vibrators 2 and is measured. The height of the projecting portions 23 according to the present invention is 1.8 mm, and the ratio Wt/Wb=0.5. The particular characteristics of the projecting portions 23 according to the present invention are denoted by solid lines in FIGS. 7-10.

The shape of the projecting portions 63 of the conventional elastic member is such that Wt/Wb=1.0 (i.e., a parallelogram shape), and the particular characteristics thereof are denoted by broken lines in FIGS. 7-10.

The characteristics of an elastic member of the present invention which are presented in FIG. 6 as a function of radial length L are: natural (resonance) frequency (see line L1), vibration amplitude in the axial direction AD of FIG. 3a (see line L2 in FIG. 6), and vibration amplitude in the circumferential direction CD (see line L3).

Figure 7:
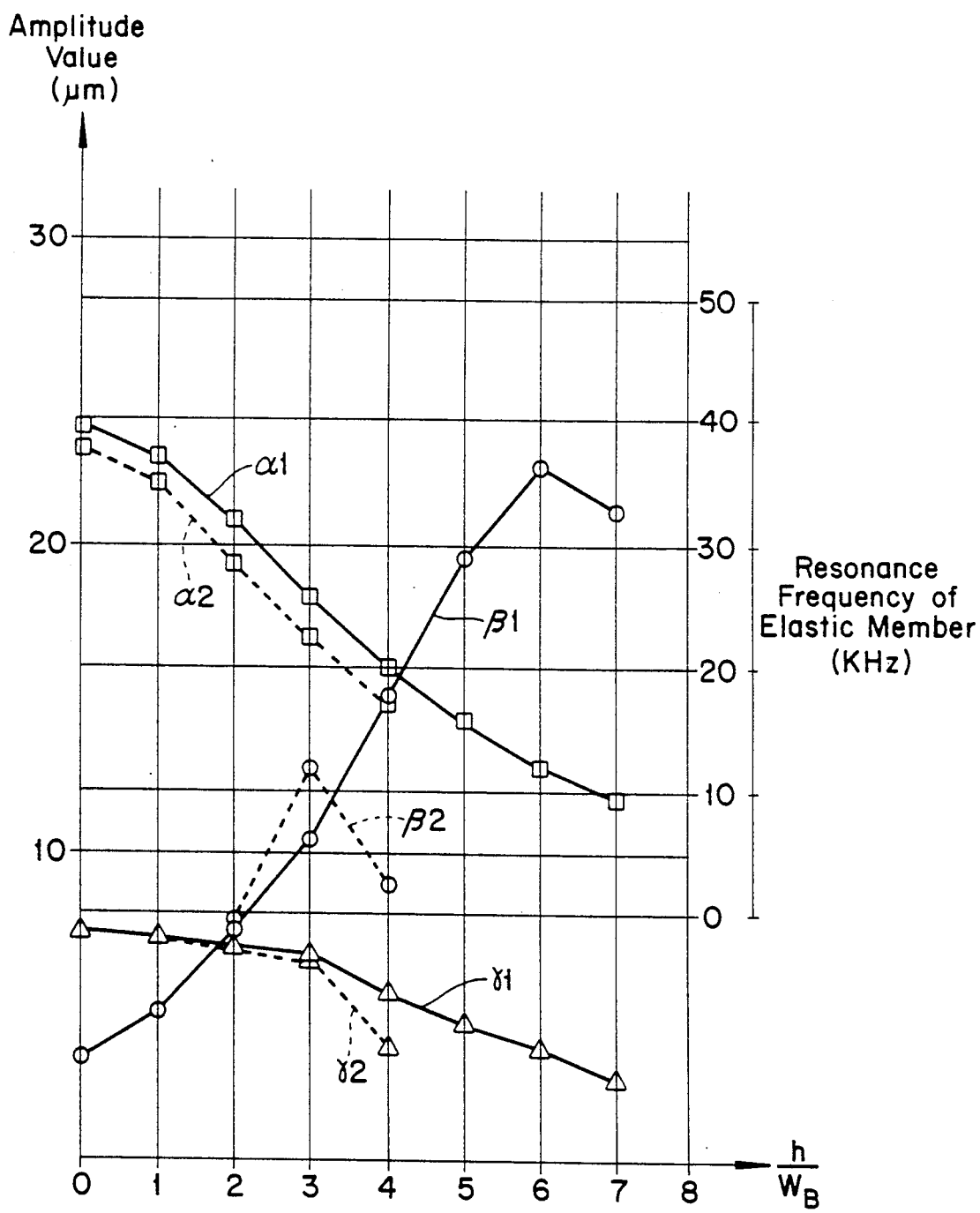
FIG. 7 is a graph representing the vibration amplitude and resonance frequency as a function of the ratio of height to maximum width of projections of a 4 mm wide elastic member according to both the prior art and the present invention, the vibration amplitude being represented in both the circumferential and axial directions.
Figure 8:
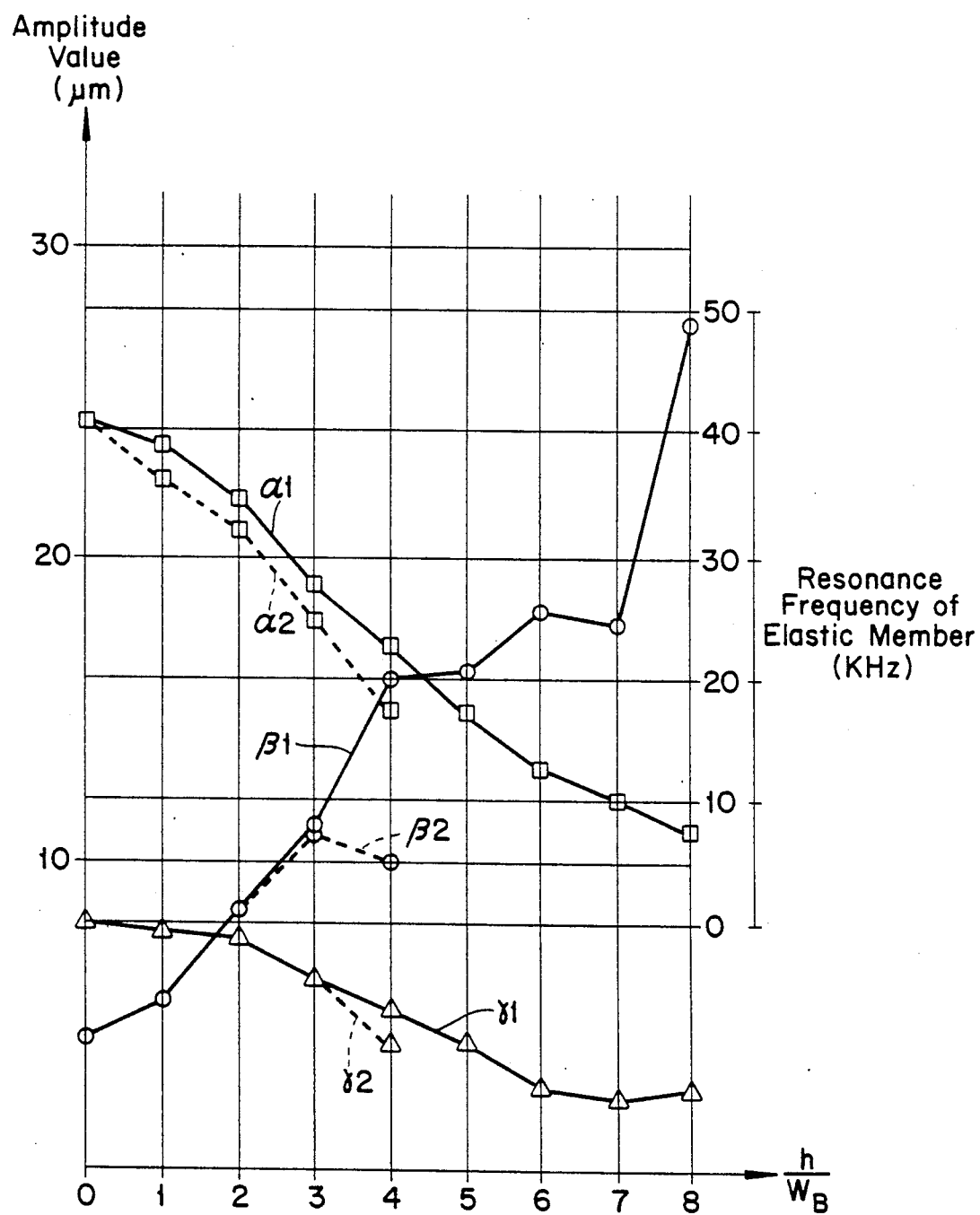
FIG. 8 is a graph similar to FIG. 7 in connection with a 6 mm wide elastic member according to both the prior art and the present invention.
Figure 9:
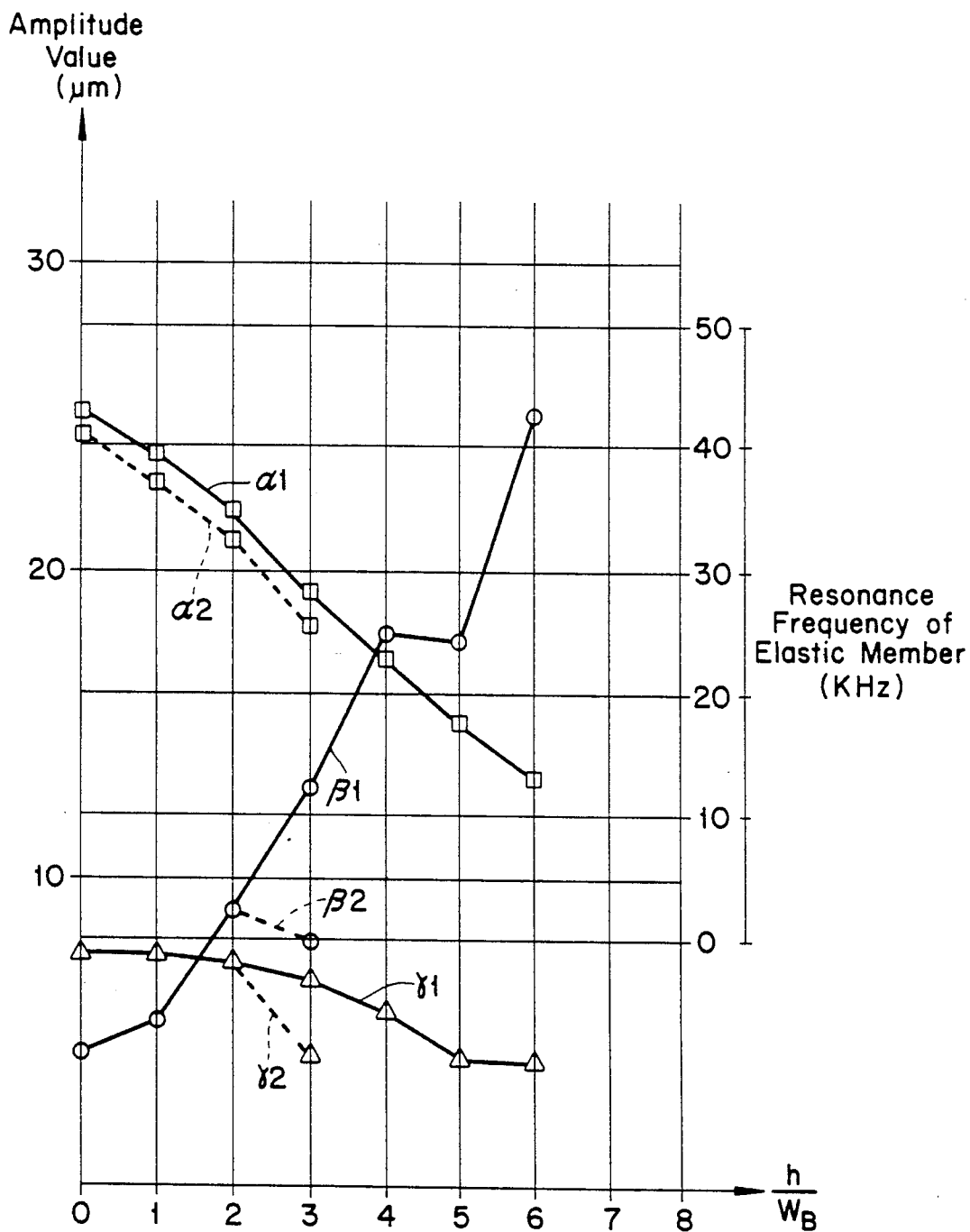
FIG. 9 is a graph similar to FIG. 8 in connection with a 7.5 mm wide elastic member according to the prior art and the present invention.
Figure 10:
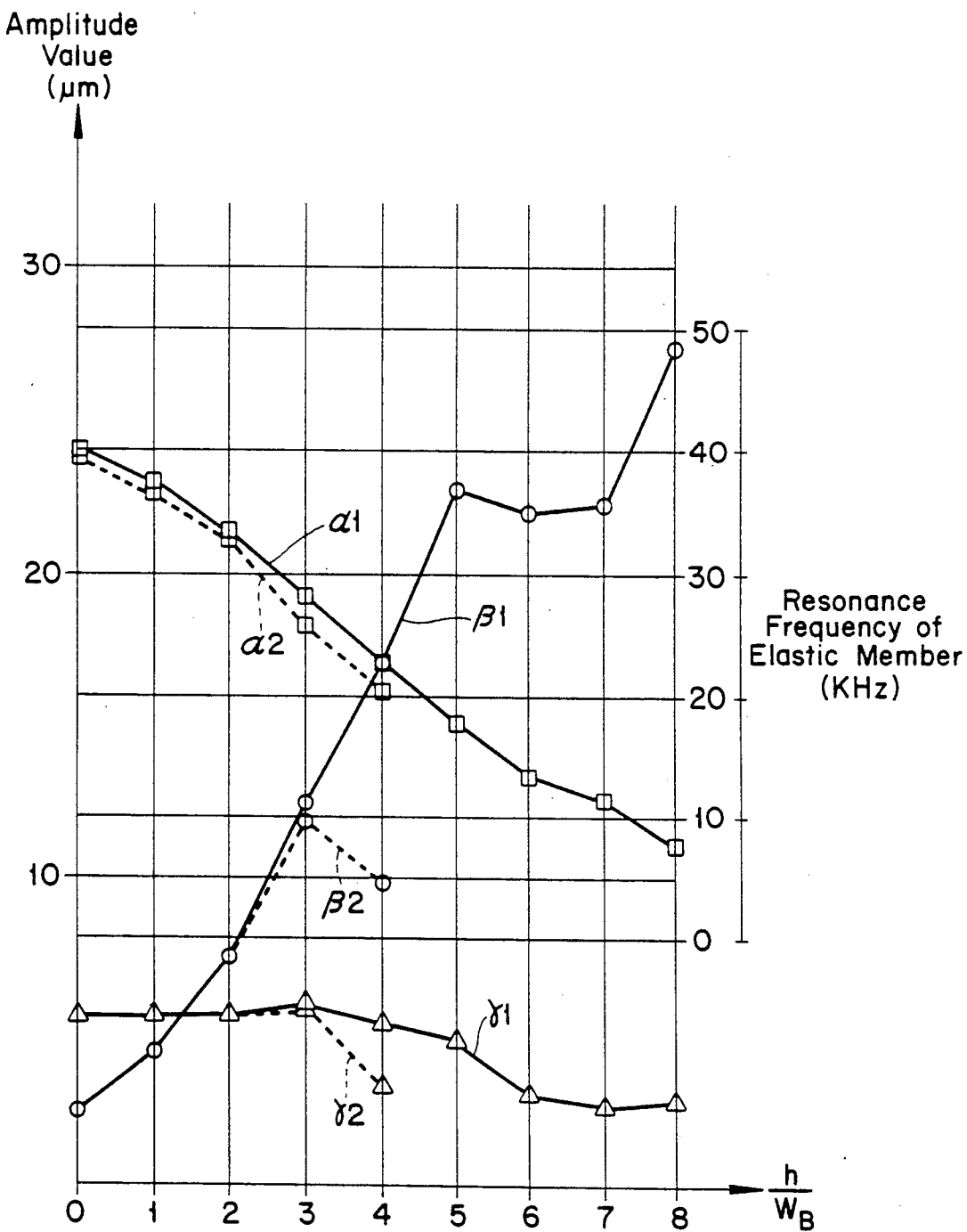
FIG. 10 is a graph similar to FIG. 8 in connection with a 10 mm wide elastic member according to both the prior art and the present invention.

FIGS. 7 through 10 are graphs in which characteristics of an elastic member 1 according to the present invention are compared with those of the conventional elastic member 61 of FIG. 5. FIG. 7 presents experimental results from the testing of an elastic member having a radial length L of 4.0 mm. FIGS. 8 through 10 represent similar experimental results from the testing of elastic members having radial lengths of 6.0 mm, 7.5 mm, and 10 mm, respectively. The shape of the projecting portions is such that Wt/Wb=0.5 in FIGS. 7 through 10, and the particular characteristics thereof are denoted by solid lines. The shape of the projecting portions of the conventional elastic member is such that Wt/Wb=1.0 (i.e., a parallelogram shape), and the particular characteristics thereof are denoted by broken lines.

In FIGS. 7 through 10, a solid line α1 and a broken line α2 indicate the natural or resonance frequency of the elastic members according to the present invention and prior art, respectively. For a given ratio of h/Wb the natural frequency of the elastic member according to the present invention ($\alpha 1$) is higher than that of the conventional elastic member ($\alpha 2$). That results from the tapering (e.g., trapezoidal) shape of the projection portion which increases the natural frequency thereof. Since the resulting natural frequency of the elastic member according to the present invention is higher than that of the conventional elastic member, a higher alternating voltage compared to the conventional apparatus can be applied to the piezoelectric vibrator to produce a higher drive frequency which remains in resonance with the elastic member. This enables the rotational speed of a rotor to be increased.

In FIGS. 7 through 10, the solid lines $\beta 1$ represent the circumferential vibration amplitude of the elastic member according to the present invention (as measured in the circumferential direction CD at the free ends of the projecting portions 23) as a function of h/Wb. The broken lines $\beta 2$ in those figures represent the same relationship for the prior art elastic member 61. It will be appreciated that for h/wb values greater than about 2.0, the circumferential vibration amplitude achieved according to the present invention is greater than that achieved by the prior art.

In FIGS. 7 through 10, the solid lines $\gamma 1$ represent the axial vibration amplitude of the elastic member according to the present invention (as measured in the axial direction AD at the free ends of the projecting portions 23) as a function of h/wb. The broken lines $\gamma 2$ represent the same relationship for the prior art elastic member 61. The line $\gamma 1$ shows that the amplitudes for the present invention are higher than the amplitudes for the prior art elastic element (see line $\gamma 2$) for values of h/wb exceeding 1.0. Even though the axial amplitudes actually decrease as h/Wb increases, such drops are relatively small and are more than compensated for by the increases in circumferential amplitude whereby the overall performance of the motor will be improved.

It can be concluded that the increased natural frequency of the elastic element according to the present invention enables a higher drive frequency to be used which still substantially corresponds to the increased natural frequency. Superior performance in terms of vibration amplitude are realized when h/Wb exceeds 1.0 and even more so when h/Wb exceeds 2.0, and to still a more substantial extent when h/Wb exceeds 3.0. The improvement in performance continues up through h/Wb values of at least 5.0.

In FIG. 4, an ultrasonic motor using the elastic member 1 according to the present invention is depicted. The motor includes a rotational shaft 9 rotatably supported by a bearing 12 in a boss of a central portion of an aluminum base 4, the latter being disc-shaped. A ring-shaped spacer 11 made of aluminum is fixedly connected to the base 4.

A circumferential edge of an inner hole of a ring-shaped stator 3 is mounted on the spacer 11. A male thread screw is formed on an outer circumference of a boss of the base 4, and a female thread of a holder 10 made of aluminum is screwed to the male thread. The stator 3 is integrated with the spacer 11 and the holder 10 by tightening the holder 10. Consequently, the base 4 and the stator 3 are integrated. The stator 3 is comprised of the ring-shaped elastic member 1 made of phosphorus bronze and the ring-shaped piezoelectric element 2. The elastic member 1 has such a form that an interval between a thick flat-shaped ring having a large diameter (hereinafter referred to as large diameter ring portion 1a) and a thin flat shaped ring having a small diameter (hereinafter referred to as small diameter ring portion 1b) is continued through a thin portion 1c, and the small diameter ring portion 1b is supported by the spacer 11 and the holder 10.

A plurality of trapezoidal projections 23 having a certain interval are formed on an upper surface of the large diameter ring portion 1a around the entire circumference thereof. A thin metal layer 17 is formed at a lower surface of the elastic member 1 continuously from the large diameter ring portion 1a to the small diameter ring portion 1b by vapor deposit. The thin metal layer 17 is contacted with the spacer 11 under pressure, so that the tin metal layer 17 is electrically connected to the base 4.

A ring-shaped piezoelectric element 2 is adhered to the thin metal layer 17 formed at a lower surface of the large diameter ring portion 1a of the elastic member 1 by adhesive material. This piezoelectric element 2 is a well-known element for generating the travelling wave of the ultrasonic motor, and an extracting electrode 2a is formed at a lower surface of the piezoelectric element 2. An electric lead 18 is connected to the extracting electrode 2a. The vibration of the travelling wave is generated in the elastic member 1 by applying an alternating voltage between the extracting electrode 2a and the thin metal layer 17.

A rotor 8 is fixed to a rotational shaft 8 and is provided with a rotating member 6 and a friction material 7. A thick portion 6a is formed at an edge portion of the rotational member 6. A lower surface of the thick portion 6a is oppositely located from the large diameter ring portion 1a of the elastic member 1. The rotational member 6 is downwardly depressed by a plate spring 13 through a rubber seat 14, so that the lower surface of the thick portion 6a is contacted with the projecting portions 23 formed on the large diameter ring portion 1a via the friction material 7.

The thin rubber seat 14 is located on the upper surface of the rotational member 6. The plate spring 13 is located on the thin rubber seat 11. Upward movement of the plate spring 13 is restricted by a flange member 20 provided on the rotational shaft 9. A thrust bearing 15 acts against the flange member 20 through a ring-shaped spacer 21 and is supported by a bearing 16 which is fixedly connected to a metal case 5 fixed to the base 4. When an alternating voltage is applied between the electric lead 18 and the metal case 5, a traveling wave is generated in response to vibration of the piezoelectric vibrator 2. The travelling wave travels on the large diameter ring portion 1a of the elastic member 1. The amplitude of the travelling wave is enlarged by the presence of the projecting portions on the large diameter ring portion 1a. Since the friction material 7 of the rotor 8 is contacted with the free ends 23t of the projecting portions 23, rotational moment is supplied to the friction material 7 by the travelling wave of the large diameter ring portion 1a, thereby rotating the rotor 8 and the rotational shaft engaged therewith.

In the above-mentioned embodiment, the thin metal layer 17 is formed at the lower surface of the elastic member 1 and is electrically connected to the base 4 (instrument ground) via the spacer 11 and the instrument ground of the piezoelectric element 4 is simplified.

Furthermore, the elastic member 1 has a ring shape, however, it is not required to especially make the elastic member in ring-shape in the aforementioned embodiment. When this embodiment according to the present invention is utilized for an ultrasonic linear motor, it is desirable to make the elastic member 1 in a linear shape.

Moreover, when a high rotational speed is required for the ultrasonic motor, the height h of the projecting portions 23 can be dramatically increased while properly setting the ratio of Wt and Wb to offset reductions in natural frequency, whereby the output speed of the rotor 8 can be increased.

On the other hand, when a high torque (as opposed to high speed) is required from the ultrasonic motor, the height h of the projecting portions 23 is decreased and a ratio of Wt/Wb is selected to minimize a loss in rotational speed of the rotor.

According to present invention, the natural frequency of the projecting portions can be raised while remaining in resonance with the rest of the elastic member. Accordingly, the natural frequency of the elastic member is increased, and the elastic member can be vibrated at a higher drive frequency while remaining in resonance with the drive frequency.

While the invention has been particularly shown and described with reference to preferred embodiment thereof, it will be understood by those skilled in the art that the foregoing and other change in form and details can be made therein without departing from the spirit and scope of the invention.

What is claimed is:

1. An ultrasonic motor comprising a piezoelectric vibrator, a rotor, and an elastic member interposed between said piezoelectric vibrator and said rotor for transmitting vibration, said elastic member including a base portion and a plurality of projecting portions, each of said projecting portions tapering towards a free end thereof, the ratio of height to maximum width of each of said tapering projecting portions being at least 1.0, said elastic member having a natural frequency substantially corresponding to a drive frequency of said vibrator.

2. An ultrasonic motor according to claim 1, wherein said ratio is at least 2.0.

3. An ultrasonic motor according to claim 1, wherein said ratio exceeds 3.0.

4. An ultrasonic motor according to claim 1, wherein said ratio is n greater than 5.0.

5. An ultrasonic motor according to claim 1, wherein said projecting portions are of trapezoidal shape.

6. An ultrasonic motor according to claim 1, wherein said plurality of projecting portions are spaced apart by at least a half wave length of the vibration generated in said elastic member.

7. An ultrasonic motor according to claim 1, wherein a minimum width of each of said tapering projecting portions is less than a minimum circumferential spacing between adjacent ones of said tapering projecting portions.

* * * * *

UNITED STATES PATENT AND TRADEMARK OFFICE
CERTIFICATE OF CORRECTION

PATENT NO. : 5,055,732

DATED : October 8, 1991

INVENTOR(S) : Chiaki UMEMURA

It is certified that error appears in the above-identified patent and that said Letters Patent is hereby corrected as shown below:

Title page, item:

[30] Foreign Application Priority Data

Apr. 5, 1988   [JP]   Japan............. 63-083776

Signed and Sealed this

Seventeenth Day of August, 1993

*Attest:*

BRUCE LEHMAN

*Attesting Officer*    *Commissioner of Patents and Trademarks*